United States Patent
Kessler et al.

(10) Patent No.: US 10,790,612 B2
(45) Date of Patent: Sep. 29, 2020

(54) PLUG-IN CONTACT ARRANGEMENT

(71) Applicant: STABILUS GMBH, Koblenz (DE)

(72) Inventors: Jonathan Kessler, Grossholbach (DE); Christof Theis, Hillscheid (DE); Jan Bochen, Eitelborn (DE); Marian Bochen, Eitelborn (DE); Eduard Jost, Hilgert (DE); Axel Knopp, Eitelborn (DE)

(73) Assignee: STABILUS GMBH, Koblenz (DE)

( * ) Notice: Subject to any disclaimer, the term of this patent is extended or adjusted under 35 U.S.C. 154(b) by 0 days.

(21) Appl. No.: 16/272,502

(22) Filed: Feb. 11, 2019

(65) Prior Publication Data

US 2019/0252822 A1    Aug. 15, 2019

(30) Foreign Application Priority Data

Feb. 9, 2018  (DE) .................. 10 2018 103 015

(51) Int. Cl.
*H01R 13/52*  (2006.01)
*H02G 3/06*  (2006.01)
*H02K 5/22*  (2006.01)

(52) U.S. Cl.
CPC ..... *H01R 13/5205* (2013.01); *H01R 13/5221* (2013.01); *H02G 3/0616* (2013.01); *H02K 5/22* (2013.01)

(58) Field of Classification Search
CPC .......... H01R 13/5205; H01R 13/5221; H02G 3/0616; H02K 5/22
USPC ...................................................... 439/587
See application file for complete search history.

(56) References Cited

U.S. PATENT DOCUMENTS

| | | | |
|---|---|---|---|
| 3,350,587 A | 10/1967 | Turk | |
| 4,998,894 A * | 3/1991 | Gronvall | G02B 6/4447 439/133 |
| 6,454,368 B1 | 9/2002 | Bedau et al. | |
| 6,995,316 B1 | 2/2006 | Goto | |
| 7,331,820 B2 * | 2/2008 | Burris | H01R 9/05 439/275 |
| 8,128,438 B2 | 3/2012 | Bernard | |
| 9,461,397 B2 | 10/2016 | Feldmeier | |
| 9,570,838 B2 | 2/2017 | Tamaki et al. | |
| 9,774,132 B2 * | 9/2017 | Lindkamp | H01R 13/5205 |
| 10,295,012 B2 | 5/2019 | Theis et al. | |

(Continued)

FOREIGN PATENT DOCUMENTS

| | | |
|---|---|---|
| CN | 102150329 A | 8/2011 |
| CN | 205406819 U | 7/2016 |

(Continued)

OTHER PUBLICATIONS

English Translation of Office Action and Search Report of Chinese Application No. 2019101084505, dated Mar. 27, 2020, 8 Pages.

*Primary Examiner* — Peter G Leigh
(74) *Attorney, Agent, or Firm* — Lucas & Mercanti, LLP

(57) ABSTRACT

A plug-in contact arrangement for an electromotive linear actuating apparatus, which is arranged in a housing which is closed by a terminal closure. The plug-in contact arrangement including a plug, which has one or more plug-in contacts, at one end of one or more cables, which are routed to the housing from the outside and can be inserted into corresponding plug-in sockets arranged on the terminal closure.

13 Claims, 2 Drawing Sheets

(56) References Cited

U.S. PATENT DOCUMENTS

| | | | | |
|---|---|---|---|---|
| 2013/0118803 A1* | 5/2013 | Magno, Jr. | ............ | H02G 15/013 |
| | | | | 174/77 R |
| 2014/0120767 A1* | 5/2014 | Itsuki | ................. | H01R 13/5208 |
| | | | | 439/587 |
| 2016/0169317 A1* | 6/2016 | Theis | ...................... | F16H 25/20 |
| | | | | 74/424.71 |
| 2017/0025788 A1* | 1/2017 | Lindkamp | ........... | H01R 13/5205 |
| 2019/0252821 A1* | 8/2019 | Kessler | ................. | H02G 3/083 |

FOREIGN PATENT DOCUMENTS

| | | |
|---|---|---|
| DE | 1874556 U1 | 6/1963 |
| DE | 29511789 U1 | 11/1996 |
| DE | 102012202225 A1 | 8/2013 |
| DE | 102014100142 A1 | 7/2014 |
| DE | 202014104733 U1 | 1/2016 |
| DE | 102014118379 B3 | 2/2016 |
| GB | 2199446 A | 7/1988 |
| JP | 2002216888 A | 8/2002 |
| JP | 2015177700 A | 10/2015 |
| JP | 2017005999 A | 1/2017 |
| WO | 2012113223 A1 | 8/2012 |

* cited by examiner

PLUG-IN CONTACT ARRANGEMENT

CROSS REFERENCE TO RELATED APPLICATIONS

The present application claims priority to DE 10 2018 103 015.0, filed on Feb. 9, 2018, the entire contents of which are incorporated herein by reference.

BACKGROUND OF THE INVENTION

The present invention relates to a plug-in contact arrangement for an electromotive linear actuating apparatus, which is arranged in a housing closed by a terminal closure. The plug-in contact arrangement includes a plug having one or more plug-in contacts at one end of one or more cables which are routed to the housing from the outside. The plug-in contacts can be inserted into corresponding plug-in sockets which are arranged on the terminal closure.

A problem of plug-in contact arrangements is the difficulty in achieving the required sealed-off connection from the cable located outside the housing to the electromotive linear actuating apparatus located in the housing.

BRIEF SUMMARY OF THE INVENTION

An object of the invention is to provide a plug-in contact arrangement of the kind mentioned in the background which, with simple design and simple assembly, allows sealed-off contacting of the plug-in contact connection and also assessment of the sealing point from the outside.

According to an embodiment of the invention, this object is achieved by an arrangement including a terminal closure for the housing having an insertion opening which is routed into the housing interior from the outside in the form of a stepped opening, a region of the stepped opening close to the housing interior having a small step with a relatively small radial extent and another region of the stepped opening close to an outer side of the terminal closure having a large step with a relatively large radial extent. The arrangement further includes a plug element with an axially extending journal piece that protrudes into the housing interior through the small step of the stepped opening and an axial retaining region that is disposed in the large step of the stepped opening in an installed position of the plug element, the cables being routed into the axial retaining region. The axial retaining region is insertable into the stepped opening from the outside as far as into the installed position and fixable in the installed position. A socket retaining element is arranged in a housing interior or an inner side of the terminal closure and includes plug-in sockets into which the plug-in contacts protrude when the plug element is in the installed position. A cable sleeve through which the cables are routed from the plug element to the outside encloses the retaining region by way of one of its ends, and is in radially encircling contact, with elastic prestress, both with the radially encircling lateral surface of the retaining region and also with the radially encircling inner surface of the large step of the stepped opening.

In an alternative embodiment, the plug-in sockets are arranged on the plug element and the plug-in contacts are arranged on a retaining element in the housing interior or the interior of the terminal closure.

To assemble the inventive arrangement, the plug-in contacts or the plug-in sockets are first connected to the plug element. The cable sleeve is then routed over the cables from that side which is opposite the plug element, until said cable sleeve, by way of one of its ends, encloses the retaining region of the plug element. This preassembled unit is now inserted into the large step of the stepped opening as far as its installed position in which the plug-in contacts are also contacted by the plug-in sockets. This results in elastically prestressed contact of the cable sleeve both with the radially encircling lateral surface of the retaining region of the plug element and also with the inner surface of the large step of the stepped opening. Therefore, the small step of the stepped opening and the region of plug-in contacts and plug-in sockets is sealed off towards the outside of the terminal closure.

The inventive configuration of stepped opening, plug element, and cable sleeve with different terminal closures allows for cost-saving equivalent parts in an extremely wide variety of linear actuating apparatuses.

The ability to preassemble the structural unit comprising the plug element, the plug-in contacts or plug-in sockets and the cables and cable sleeve significantly simplifies assembly since it is now only necessary to insert this structural unit into the large step of the stepped opening.

Since the sealing point between the cable sleeve and the stepped opening is located close to the mouth of the stepped opening towards the outside, it is easy to monitor at this mouth of the stepped opening whether this sealing point actually also has a sealing effect. The visibility of a leak from the outside also results in a reduction in reclamation costs.

The cable sleeve is preferably composed of an elastic material, so that no additional sealing elements are required.

According to an embodiment of the present invention, the cable sleeve is connectable to the plug element in an interlocking manner. This arrangement obviates the need for additional plug elements, Therefore, assembly is also simple.

According to an embodiment of the present invention, the retaining region of the plug element has, on its radially encircling lateral surface, a radially encircling retaining groove into which a radially inwardly protruding annular attachment of the cable sleeve protrudes.

The cable sleeve has a radially encircling, radially protruding sealing bead on its region which protrudes into the large step of the stepped opening, the region of the sealing bead is particularly elastic and provides an enhanced sealing effect.

In another embodiment of the present invention, the retaining region of the plug element has a flange-like widened portion that bears axially against the annular face at the transition from the small step to the large step of the stepped opening in the installed position of the plug element, at which position the retaining region is disposed in the large step of the stepped opening.

In yet another embodiment, a barb-like blocking attachment is arranged on the end region of the journal piece of the plug element that protrudes into the housing interior. The blocking attachment is foldable against a lateral surface of the journal piece when the journal piece is inserted into the small step of the stepped opening and the blocking attachment being unfolded elastically radially outwards when the plug element reaches the installed position.

As a result, the blocking attachment engages behind the housing interior-side mouth region of the small step of the stepped opening and secures the plug element against becoming unintentionally released from its installed position in the installed position of the plug element. Further, it is then not possible to pull the plug element out of the stepped opening solely by the application of axial force, without detaching the blocking attachment in the process. Therefore, the plug element can be securely fitted on the terminal closure from the outside.

In a further embodiment of the present invention, the plug element has a cross section which differs entirely or partially from a symmetrical cross section and the stepped opening has a corresponding cross section which differs entirely or partially from a symmetrical cross section, such that the plug element can be fitted to the terminal closure with only a specific orientation.

Depending on the prespecified installation conditions of the linear actuating apparatus, the stepped opening can extend in an angular range of between 0° and 90° in relation to the longitudinal axis of the linear actuating apparatus.

This is particularly advantageous when the terminal closure has a connection piece, so that the cable sleeve and the connection piece can be oriented in different directions for easier assembly of plug element and cable sleeve.

The connection piece, which is a ball socket in one embodiment of the invention, can be oriented at an angle of between 90° and 270°, preferably about an angle of 180°, with respect to the orientation of the fitted cable sleeve.

In a preferred embodiment, the linear actuating apparatus is a spindle mechanism, the spindle drive motor of which is arranged in the housing interior and contacted by the cable.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is illustrated in the drawings and will be described in more detail below.

DETAILED DESCRIPTION OF THE PREFERRED EMBODIMENTS

Figure 1:
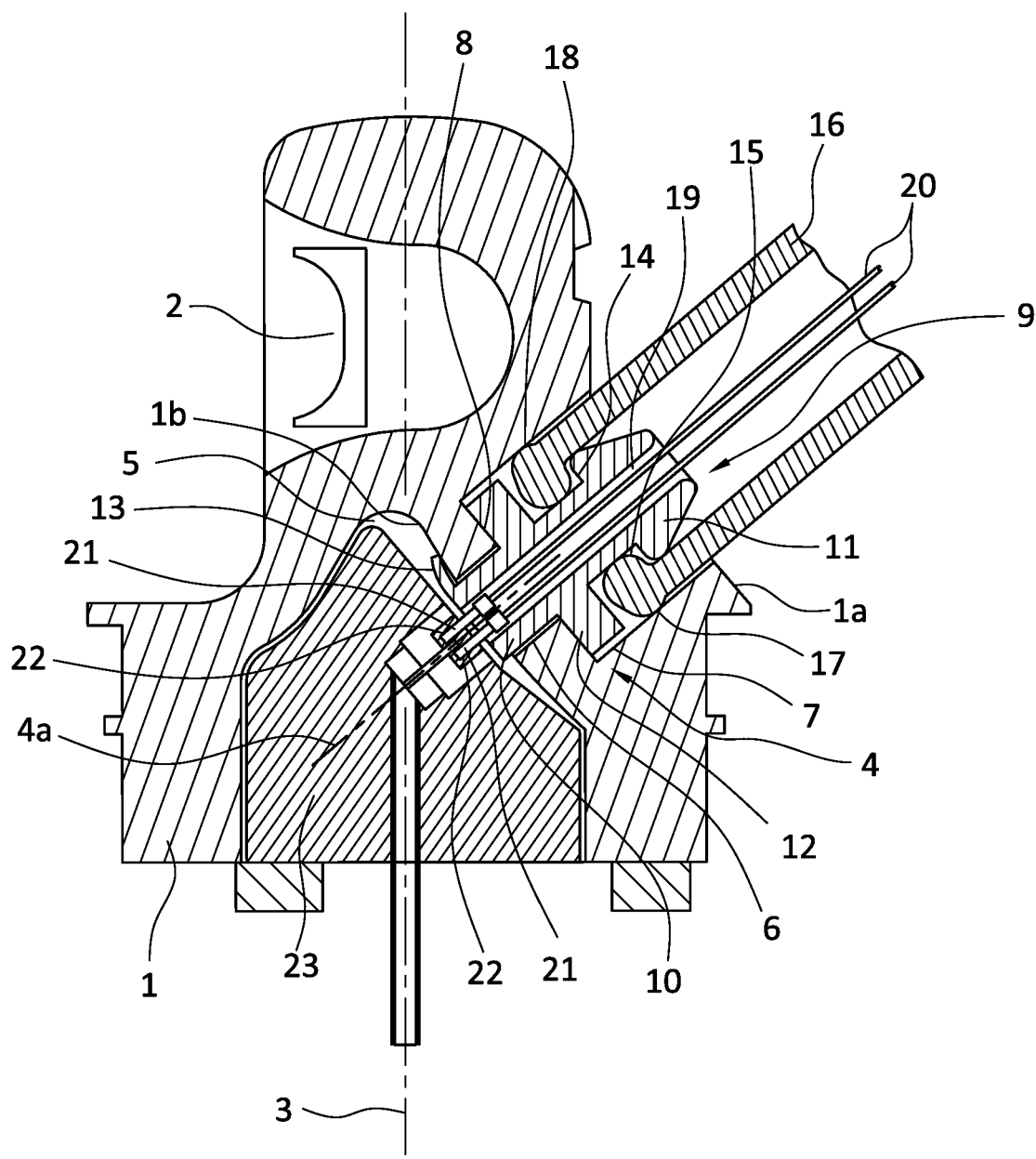
FIG. 1 is a longitudinal sectional view through a plug-in contact arrangement according to an embodiment of the present invention.
Figure 2:
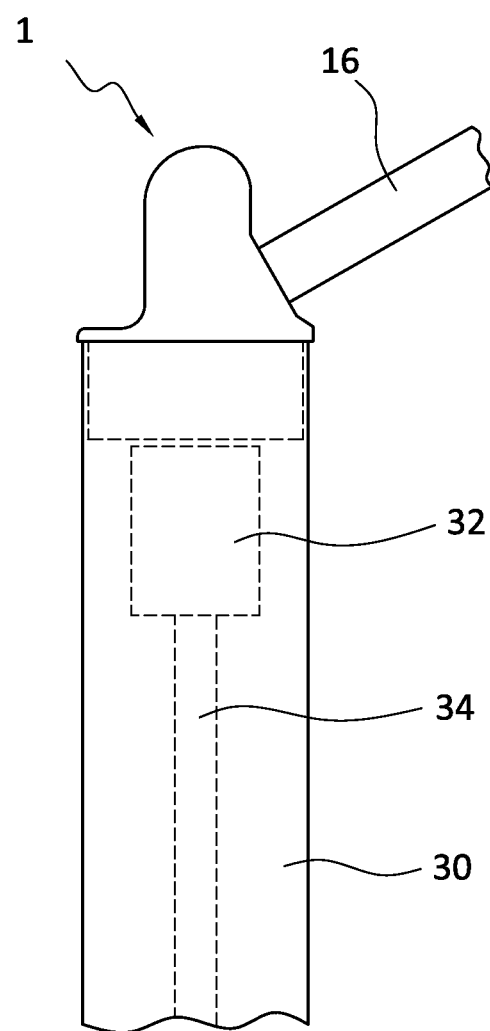
FIG. 2 is a partial side view of a housing with a terminal closure including the plug-in contact arrangement of FIG. 1.

The plug-in contact arrangement illustrated in FIG. 1 has a terminal closure 1 for a tubular housing 30 which forms a base piece. FIG. 2 shows an upper end of the tubular housing 30 in which an electric motor 32 for a spindle mechanism 34 which forms a linear actuating apparatus is arranged. The electric motor 32 and spindle mechanism 34 are shown schematically in dashed lines in the housing.

Referring back to FIG. 1, a ball socket which forms a connection piece 2 is formed on the terminal closure 1, the ball socket being oriented at a right angle in relation to a longitudinal axis 3 of the housing 30.

The terminal closure 1 includes a stepped opening 4 that extends from an outer side 1a to an inner side 1b of the terminal closure 1. The stepped opening 4 has a small step 6 of relatively small cross section, which small step issues into the inner side 1b of the terminal closure 1 that faces the housing interior 5 of the housing in an installed position, and a large step 7 of relatively large cross section, which large step is routed to the outer side 1b of the terminal closure 1. The stepped opening 4 faces away from the connection piece 2 such that the stepped opening 4 is oriented about 180° in relation to the orientation of the connection piece 2. A longitudinal axis of the stepped opening 4 is also inclined through 45° in relation to the longitudinal axis 3.

An annular face 8 which extends at a right angle in relation to the longitudinal axis 4a of the stepped opening 4 forms a transition from the small step 6 to the large step 7 of the stepped opening 4.

A plug element 9 is inserted into the stepped opening 4. The plug element 9 has an axial journal piece 10 that protrudes through the small step 6 of the stepped opening 4, an axial retaining region 11 that is disposed in the large step 7 of the stepped opening 4, and a flange-like widened portion 12 that is in contact with the annular face 8 of the terminal closure 1 in the large step 7 when the plug element 9 is fully inserted into the stepped opening in an installed position.

A barb-like blocking attachment 13 which can be folded elastically towards the retaining region 11 out of its radially outwardly folded blocking position is formed on that region of the journal piece 10 that protrudes into the housing interior 5. The barb-like blocking attachment 13 is folded during insertion of the plug element 9 when the plug element 9 is routed through the small step 6 of the stepped opening 4 from the outside as far as to the installed position. When the plug element 9 reaches the installed position, the blocking attachment 13 has then reached a position fully in the housing interior 5 and the flange-like widened portion 12 is in contact with the annular face 8. In this installed position, the blocking attachment 13 is free to unfold radially outwards on account of its elasticity and prevent removal of the plug element 9.

A radially encircling retaining groove 14 is formed on a radially encircling casing surface of the retaining region 11 in a manner adjoining the flange-like widened portion 12 and one end of the cable sleeve 16 includes an annular attachment 15 protruding into the retaining groove. The annular attachment 15 is composed of an elastic material and is in contact with the base of the retaining groove 14 with prestress.

The cable sleeve 16 furthermore has, in the region of the annular attachment 15, in a radially encircling outwardly projecting manner, a sealing bead 17 which is in contact with the radially encircling inner surface 18 of the large step 7 with prestress.

Owing to the contact of the annular attachment 15 with the base of the retaining groove 14 with elastic prestress and also the contact of the sealing bead 17 with the inner surface 18 of the large step 7 with elastic prestress, the plug element 9 is arranged in a sealed-off manner in the stepped opening 4 and seals off the housing interior 5 towards the outside.

The plug element 9 has an axial bore 19. A plurality of cables 20 are routed through the cable sleeve 16 and the bore 19 in the plug element 9, in a manner sealed from the outside, as far as the terminal closure-side end region of the plug element 9 in order to be conductively connected to plug-in contacts 21 there. The plug-in contacts 21 are fixedly connected to the plug element 9 and protrude axially out of the plug element 9.

In the installed position illustrated in FIG. 1, the plug-in contacts 21 are inserted into the plug-in sockets 22 which are arranged in a socket retaining element 23 which is fixedly arranged in the housing interior 5. An electrical connection between the plug-in sockets 22 and the electric motor, not illustrated, is established from the socket retaining element 23.

Thus, while there has been shown and described and pointed out the fundamental novel features of the invention is applied to a preferred embodiment thereof, it will be understood that various omissions and substitutions and changes in the form and details of the devices illustrated, and in their operation, may be made by those skilled in the art without departing from the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

LIST OF REFERENCE SYMBOLS

1 Terminal closure
2 Connection piece
3 Longitudinal axis
4 Stepped opening
5 Housing interior
6 Small step
7 Large step
8 Annular face
9 Plug element
10 Journal piece
11 Retaining region
12 Flange-like widened portion
13 Blocking attachment
14 Retaining groove
15 Annular attachment
16 Cable sleeve
17 Sealing bead
18 Inner wall
19 Bore
20 Cable
21 Plug-in contacts
22 Plug-in sockets
23 Socket retaining element

What is claimed is:

1. A plug-in contact arrangement for an electromotive linear actuating apparatus arranged in a housing, the plug-in contact arrangement comprising:
   a terminal closure configured to close the housing and having an insertion opening that extends through the terminal closure from an outer side to an inner side, the inner side facing an interior of the housing when the terminal closure closes the housing, the insertion opening being a stepped opening with a small step in a region proximate the inner side and a large step in a region proximate the outer side, the small step having a smaller radial extent than the large step;
   a plug element insertable into the insertion opening to an installed position and having a journal piece and a retaining region, wherein the journal piece protrudes into the small step and the retaining region is disposed within the large step in the installed position, and the plug element is fixed relative to the terminal closure in the installed position;
   one of plug-in contacts and plug-in sockets disposed on a free end of the journal piece of the plug element;
   cables routed axially through the retaining region and connected to the one of the plug-in contacts and the plug-in sockets;
   a retaining element arranged proximate the inner side of the insertion opening and including an other one of the plug-in contacts and the plug-sockets;
   a cable sleeve through which the cables are routed, the cable sleeve having an end that encloses the retaining region of the plug element in radially encircling contact with elastic prestress and also contacts with elastic prestress an inner surface of the large step of the insertion opening.

2. The plug-in contact arrangement according to claim 1, wherein the cable sleeve is composed of an elastic material.

3. The plug-in contact arrangement according to claim 1, wherein the cable sleeve is connected to the plug element by an interlocking connection.

4. The plug-in contact arrangement according to claim 3, wherein the end of the cable sleeve that encloses the retaining region of the plug element has a radially inwardly protruding annular attachment, and the retaining region of the plug element includes a radially encircling retaining groove into which the radially inwardly protruding annular attachment of the cable sleeve protrudes.

5. The plug-in contact arrangement according to claim 1, wherein the cable sleeve has, in a region which protrudes into the large step of the stepped opening, a radially encircling, radially protruding sealing bead.

6. The plug-in contact arrangement according to claim 1, the retaining region of the plug element has a flange widened portion that bears axially against an annular face at the transition from the small step to the large step of the stepped opening when the plug element is in the installed position.

7. The plug-in contact arrangement according to claim 1, further comprising a barb blocking attachment arranged proximate the free end of the journal piece of the plug element, the blocking attachment being folded against a lateral surface of the journal piece when the journal piece is inserted into the small step of the stepped opening and the blocking attachment being unfolded elastically radially outwards in the installed position of the plug element.

8. The plug-in contact arrangement according to claim 1, wherein the plug element has a cross section which differs entirely or partially from a symmetrical cross section and the stepped opening has a corresponding cross section which differs entirely or partially from a symmetrical cross section.

9. The plug-in contact arrangement according to claim 1, wherein the stepped opening has a longitudinal axis that extends in an angular range of between 0° and 90° in relation to the longitudinal axis of the housing when the terminal closure closes the housing.

10. The plug-in contact arrangement according to claim 1, wherein the terminal closure has a connection piece for mounting the housing.

11. The plug-in contact arrangement according to claim 1, wherein the linear actuating apparatus is a spindle mechanism, a spindle drive motor of which is arranged in the housing interior and contacted by the cables.

12. The plug-in contact arrangement according to claim 1, wherein the plug-in contacts are arranged on the journal piece, and the plug-in sockets are arranged on the retaining element.

13. The plug-in contact arrangement according to claim 12, wherein the journal piece protrudes through the small step in the installed position of the plug element.

\* \* \* \* \*